(12) United States Patent
Macliver

(10) Patent No.: US 7,407,226 B2
(45) Date of Patent: Aug. 5, 2008

(54) CHILDRENS SAFETY SEAT

(76) Inventor: Kevin Scott Macliver, Elm House Belle Walk, Moseley, Birmingham (GB) B13 9DF ( * ) Notice: Subject to any disclaimer, the term of this patent is extended or adjusted under 35 U.S.C. 154(b) by 78 days.

(21) Appl. No.: 10/562,502

(22) PCT Filed: Jul. 1, 2004

(86) PCT No.: PCT/GB2004/002834

§ 371 (c)(1),
(2), (4) Date: Dec. 23, 2005

(87) PCT Pub. No.: WO2005/002909

PCT Pub. Date: Jan. 13, 2005

(65) Prior Publication Data

US 2006/0163921 A1  Jul. 27, 2006

(30) Foreign Application Priority Data

Jul. 2, 2003  (GB) .................... 0315495.2

(51) Int. Cl.
B60R 21/00 (2006.01)
B60N 2/42 (2006.01)
A47C 15/00 (2006.01)

(52) U.S. Cl. .................. 297/216.11; 297/216.2; 297/248

(58) Field of Classification Search ........ 297/216.11, 297/216.19, 216.2, 250.1, 216.1, 248
See application file for complete search history.

(56) References Cited

U.S. PATENT DOCUMENTS

| 3,698,150 | A | * | 10/1972 | Anderson ................. 52/732.1 |
| 4,640,545 | A | * | 2/1987 | von Wimmersperg .. 297/216.11 |
| 4,966,415 | A | * | 10/1990 | Schwartz et al. ......... 297/448.1 |
| 5,344,210 | A | * | 9/1994 | Marwan et al. .......... 297/216.2 |
| 5,584,525 | A | * | 12/1996 | Nakano et al. ............. 296/68.1 |
| 5,664,830 | A | | 9/1997 | Garcia et al. |
| 5,685,603 | A | | 11/1997 | Lane, Jr. |
| 5,967,604 | A | * | 10/1999 | Yoshida et al. ......... 297/216.19 |
| 5,997,085 | A | * | 12/1999 | MacLiver ................... 297/248 |
| 6,817,665 | B2 | * | 11/2004 | Pacella et al. ............ 297/250.1 |
| 2001/0052724 | A1 | | 12/2001 | Kamper et al. |

FOREIGN PATENT DOCUMENTS

| DE | 3422695 A1 | 12/1985 |
| EP | 0164909 B1 | 1/1988 |
| EP | 0927659 B1 | 7/1999 |
| EP | 0844938 B1 | 12/1999 |
| EP | 0967113 A2 | 12/1999 |
| WO | WO 03055717 A1 * | 7/2003 |

OTHER PUBLICATIONS

International Search Report re PCT-GB2004-002834 dated Oct. 14, 2004.

* cited by examiner

Primary Examiner—Milton Nelson, Jr.
(74) Attorney, Agent, or Firm—Caesar, Rivise, Bernstein, Cohen & Pokotilow, Ltd.

(57) ABSTRACT

A car seat for several children and to sit on top of a regular car seat has leg assemblies arranged to absorb energy and reduce pitching in the event of a car crash.

8 Claims, 5 Drawing Sheets

CHILDRENS SAFETY SEAT

CROSS-REFERENCE TO RELATED APPLICATIONS

This national stage application claims the benefit under 35 U.S.C. §371 of International Application No. PCT/GB2004/002834 filed on Jul. 1, 2004, entitled CHILDRENS SAFETY SEAT, which in turn takes its priority from British Application No. 0315495.2 filed on Jul. 2, 2003, and all of whose entire disclosures are incorporated by reference herein.

BACKGROUND OF THE INVENTION

1. Field of the Invention

This invention relates to a children's safety seat and is particularly concerned to provide a seat that can conveniently be fitted into, and removed from, a motor vehicle as required, to enable more than one child to be safely accommodated.

2. Description of Related Art

Child safety seats are well known and usually comprise an individual child's seat which can be removably connected into a suitably anchored restraining harness on the back seat, or, in some instances, the front seat, of a motor car. Such seats are useful for children weighing up to about 35 kg.

Problems arise when it is necessary to cater for more than one child. Although it is quite possible to arrange for two separate safety seats to be releasably anchored on the rear seat of a car, it is difficult to cater for three children and virtually impossible for four. Moreover, the fitting of anchorage for a multiplicity of safety seats is time-consuming and expensive and the purchase and physical handling of a number of seats expensive and inconvenient.

FR-A-2 559 043 discloses a children's safety seat to be securely and releasably attached to points in a motor vehicle when positioned on an existing seat of the vehicle; the safety seat having a back portion and a base portion which are subdivided to provide two individual seats, whereby the seat has integral means which enable it to be anchored in position.

EP-A-0574848 discloses a rearward-facing seat for a small child mounted on an ordinary passenger seat and held in place by a combination of a frame and straps. By this means the safety seat can be positioned on a seat in a vehicle to face backwards with the head of the child comfortably above its feet in a semi-reclining position.

BRIEF SUMMARY OF THE INVENTION

It is an object of the invention to provide a safety seat that is suitable for more than one child and that is more convenient than current arrangements to deal with more than one child and can absorb impact energy better than other known seats.

My European patent 0844938 (which is not a prior publication) discloses a child's safety seat comprising a plurality of seats for fitting onto the existing back seat of a motor car. One of the problems found with this design of seat is that when there are, for example, four occupants in four seats the total weight of the occupants imposes high loads on the strap restraints that hold the seat into place in the car. In the event of severe braking of the car or in a crash or impact, the seat tends to tilt forwards with the front edge of base portion, or seat, dipping unacceptably downwards.

A further object of the present invention is to provide a seat of the type described and claimed in my European patent 0844938 with additional energy absorbing leg assemblies that locate on rigid structure of the car to stabilise the seat and reduce or eliminate unacceptable pitching forward of the seat.

According to one aspect of the present invention, there is provided a safety seat comprising, a seat body including a base portion for being positioned on an existing seat of a vehicle and a back portion extending up from the base portion, divider means connected to the seat body for sub-dividing the seat body to provide a plurality of individual seats for accommodating two or more children side-by-side, releasable anchoring means for connecting the seat body to anchorage points in the vehicle for securing the seat body therein; characterised by support leg assemblies for engaging a body of the vehicle below the base portion and for supporting and providing additional rigidity to the seat body, the support legs being connected to the base portion for vertical and horizontal movement with respect to the base portion, the leg assemblies incorporating energy absorbing means adapted to absorb energy in the event of the vehicle being involved in an accident.

In a second aspect the invention provides a safety seat comprising a seat body including a base portion for being positioned on an existing seat of a vehicle and a back portion extending up from the base portion, divider means connected to the seat body for sub-dividing the seat body to provide a plurality of individual seats for accommodating two or more children side-by-side, releasable anchoring means for connecting the seat body to anchorage points in the vehicle for securing the seat body therein; support leg assemblies for engaging a body of the vehicle below the base portion and for supporting and providing additional rigidity to the seat body, the support leg assemblies being connected to the base portion for vertical and horizontal movement with respect to the base portion, the leg assemblies comprising an upper generally horizontal portion and a vertical portion, wherein the horizontal portion is adapted to absorb energy in the event of the vehicle being involved in an accident.

In a third aspect there is provided a children's safety seat, wherein the seat body has elongate sockets extending in a forwards direction when the seat is located in the vehicle, and the sockets are positioned, dimensioned and arranged to accommodate part of the legs of the preceding paragraph.

The legs are preferably adjustable for width and height so as to be applicable to a variety of vehicles and they may bear down, for example, on the inner sills of the vehicle or on the floor pan of the vehicle to provide additional rigidity and support to the seat.

The leg assemblies can take a variety of forms. Preferably the leg assemblies comprise an upper horizontal portion (like a thigh); a knee portion; and vertical leg portion. In one embodiment, an energy absorber is present in the leg, preferably the vertical portion; and/or the horizontal portion may move telescopically in a socket below the seat; and/or the knee portion may bend and/or the horizontal portion may be arranged to bend upwardly.

In a particularly preferred embodiment, the seat is designed to extend for substantially the full width of a vehicle's existing back seat on which it is to be positioned. Thus, it may be of a length to fill completely the width of the rear seat of a motor car. It may be specifically designed to fit the full width of a particular make and model of car.

Such a full width children's seat may conveniently be sub-divided to provide four individual child's seats in the one integral seat. Alternately, it may be sub-divided to form three slightly larger seats for children or two or three children's seats and one adult seat.

Preferably the seat is integrally-moulded of plastics material to form a sufficiently strong and rigid integral back and base portion with integrally-formed sub-divisions in the form of protrusions on the back and/or base portions to define the individual seats.

The anchorage means for anchoring the seat to the vehicle may be suitably positioned holes or slots moulded into the seat to receive anchorage straps for attachment to secure anchorages on the vehicle in a conventional manner.

Alternatively the seat may be a welded metal frame having the back and base portions and welded subdividers. Suitable anchorage holes and slots may then be drilled in the desired locations.

The seat may carry suitable padding and decorative covering material together with individual harnesses for each child's seat portion, as is conventional.

Although it is preferred to fit the seat onto the existing back seat of a vehicle, it is not necessary that the seat be designed to fit onto the back seat of a car. It may, if desired, be designed to fit onto the front passenger seat, in which case it will normally be of a length to provide seats for two children, i.e. it will have one set of sub-dividers.

It is a requirement of law in certain countries that very young children must sit in a rearward-facing seat. For example, in the United Kingdom, children up to 9 kg. in weight (approximately up to 10 months) must be seated in a rearward facing seat as their necks are insufficiently strong to support their heads in the event of a frontal collision of the vehicle in which they are travelling. In Sweden, children up to 4 years of age must be seated in rear-facing seats for similar reasons.

The shell may be an integral moulding of suitable plastics material and the stand and projections may be part of the integral moulding.

Alternatively, as indicated above the shell may be of welded metal construction.

BRIEF DESCRIPTION OF SEVERAL VIEWS OF THE DRAWINGS

Embodiments of the invention will now be described by way of example only with reference to the accompanying diagrammatic drawings in which.

DETAILED DESCRIPTION OF THE INVENTION

Figure 1:
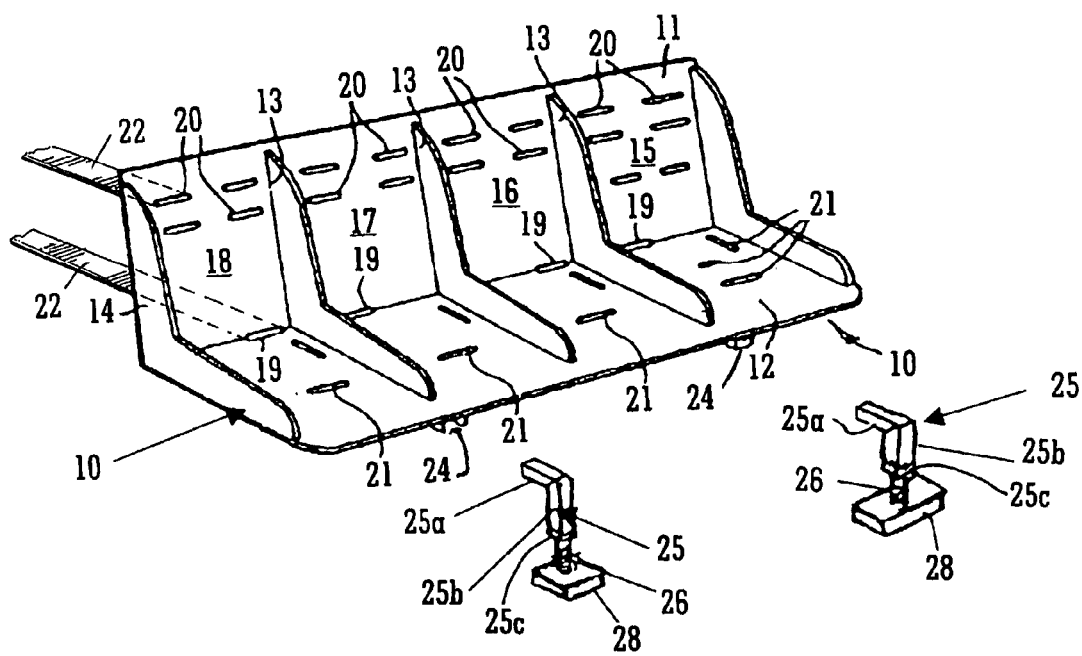
FIG. 1 is a perspective view of one form of chassis for a children's seat of the type described in EP 0844938 modified to incorporate the present invention.
Figure 2:
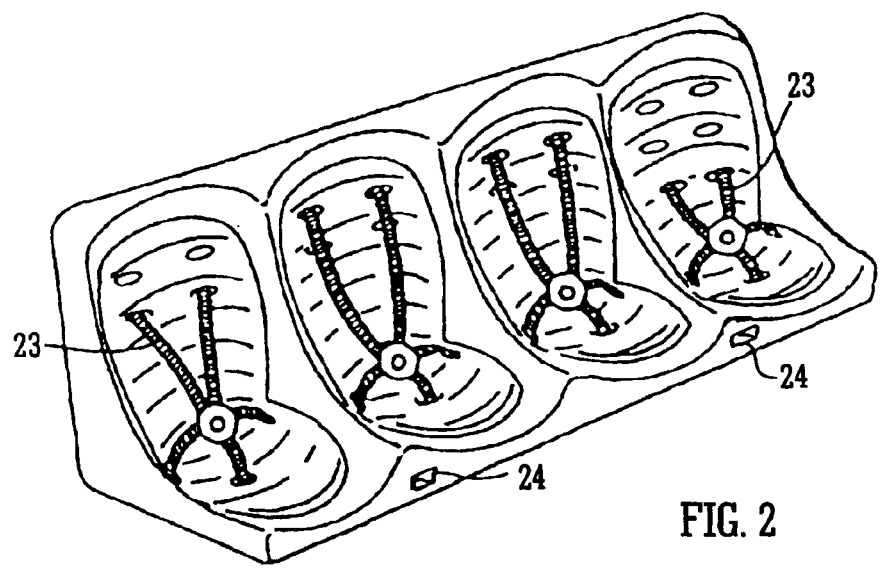
FIG. 2 shows the chassis of FIG. 1 upholstered and fitted with safety harness.

Referring to the FIGS. 1 and 2 a children's seat body in accordance with the present invention comprises a chassis 10, as shown in FIG. 1, which is upholstered as shown in FIG. 2. The chassis 10 has an integral back portion 11 and a base portion 12. The seat has three sets of dividers 13 and end fittings 14 at each end to define four separate child's seats 15, 16, 17 and 18. Slots 19 along the dividing line between back 11 and base 12, and slots 19 in the back 11 and 21 in the base 12, provide means to receive anchorage straps 22 for anchoring the chassis 10 to the vehicle's safety seat anchorage points. The slots 20 and 21 also provide means to receive child's harness straps 23 while providing means for adjustment as required.

The seat body 10 is designed to sit on top of the vehicle's existing seat cushions (not shown) and not used in place of the existing seat. The base portion 11 of the chassis 10 sits on top of the existing seat cushions of the vehicle's existing seat whereas the back portion 12 of the chassis 10 lies adjacent the backrest part of the vehicle's existing seat.

In accordance with the present invention, the seat chassis 10 is provided with rectangular-shaped (but could be of any desired cross-sectional shape) elongate sockets 24 that are positioned, shaped and arranged to receive and retain adjustable legs 25. The legs 25 are provided at each front corner of the chassis 10 but this is not necessary in all cases. The legs 25 are of a shape complementary to that of the sockets 24. In the drawing they are shown as of rectangular cross-sectional shape. The legs 25 are made of a hollow tube that is bent in a right angle to form a horizontal portion 25a and a downward projecting portion 25b. At the free end of the downward projecting portion 25b of the leg 25, a captive screw-threaded nut 25c is located inside the tube 25b. A screw-threaded foot 26 is screwed into the captive nut 25c. If desired, a lock nut (not shown) may be screwed onto the screw thread 26a of the foot 26.

The leg assembly is designed to absorb energy either by foot built as an energy absorbing structure (see below), as the lower leg sliding telescopically inside the upper leg or the horizontal portion of the leg deforming in a controlled manner. As shown in FIG. 1, the foot 26 is provided with an energy absorbing structure 28 that, in the event of an accident, absorbs energy. The energy absorbing structure 28 is preferably made from a material manufactured by Cellbond Composites Ltd called Hyload or Pressload. This material is designed to crumple in a controlled manner when subjected to compressive impact loads in excess of a predetermined threshold value. The energy absorbing structure 28 is preferably an integral part of each leg. That is to say the foot 26 of each leg 25 is bonded or secured to the pad 28. If desired the pad 28 need not be bonded or secured to each leg but in this case the pad 28 needs to have means, such as a recess or socket in which the foot 26 locates so that the pad 28 does not get dislodged from under the respective foot 26.

If desired, the captive nut 25c may be secured to an energy absorbing material (not shown) located inside the lower portion 25b of the leg 25. This energy absorbing material is the same as that shown as 28 in FIG. 1 but would be designed to crumple in a controlled manner when the foot 26 is subjected to an impact load above a predetermined value that shears the fixing of the foot 26 to lower portion 25b and compresses the energy absorbing material inside the tube 25b of the leg 25.

The horizontal portion 25a of the legs is designed to deform in the event of a crash that would subject the legs 25 to impact loads.

Preferably the legs 25 are padded with externally mounted padding (not shown) to minimise injury to the occupants in the seats.

It will be appreciated that the legs 25 are insertable into the sockets 24 by varying amounts to accommodate different car rear seat depths, and are adjustable to accommodate different heights of car seats by screwing the foot 26 up and down relative to the legs 25. The horizontal portions 25a of the legs 25 may be provided with ratchet surfaces (not shown) that co-operate with spring loaded pawls (not shown) that project into the bore of the sockets 24 to engage the ratchet surfaces so that the legs 25 may be locked in place in the sockets 24 to accommodate different depths of car seats.

In the event of a crash, a leg 25 will tend to bend at its thigh portion, so lifting the foot off the floor of the vehicle. With such a structure, the energy absorbing foot can be dispensed with.

If desired, an energy absorbing material (similar to the material 28), may be located inside the sockets 24 so that if the legs 25 are subjected to an impact load in excess of a threshold value in the event of an accident, the leg 25 slides in the sockets 24 to compress the energy absorbing material (and thereby expend energy) in a controlled manner.

As indicated above and as shown in FIG. 2, the seat 10 will normally be upholstered with cloth covered padding to provide comfort and a pleasing appearance and will be fitted with releasable safety straps or harness 23 to hold each child in position.

Figure 3:
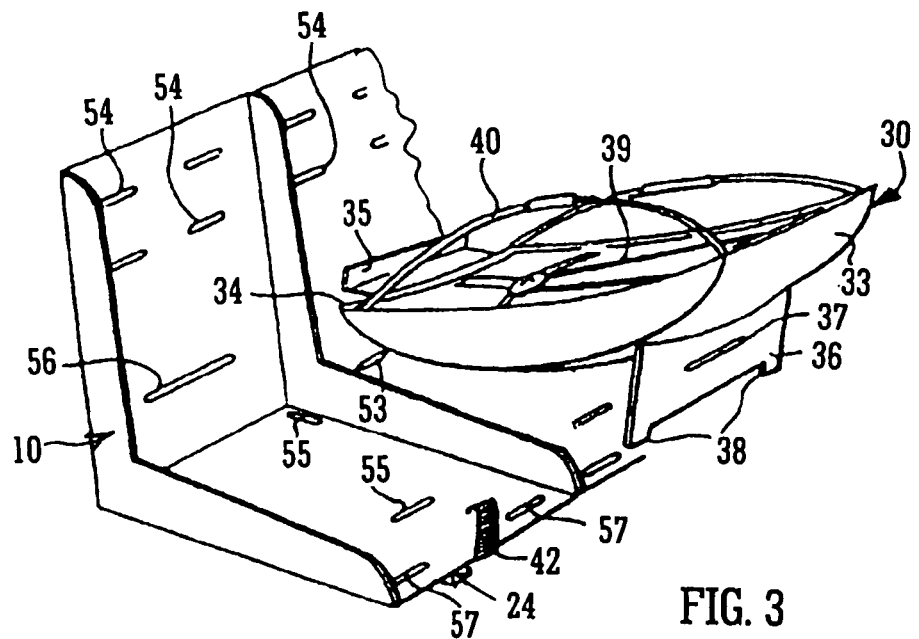
FIG. 3 is a perspective view of a seat of the invention being presented to a seat chassis similar to that of FIG. 1 and incorporating the present invention.

In FIG. 3 is shown a detachable baby's safety seat 30 for use with a seat chassis (10) that is similar to the seat chassis shown in FIG. 1. The safety seat 30 has a body shell 33 of generally rectangular plan form. At one shorter edge 34 it has a projecting locating tongue 35. Underneath it has a stand 36 containing a slot 37 and two projecting feet 38. It is upholstered internally by conventional means and has a safety harness 39 and straps 40 by which it can be carried when not in use in a vehicle.

Seat chassis 10 has a back portion 11 and a number of seat portions 11*a* similar to that of the chassis 10 of FIG. 1. Again the chassis 10 is provided with two sockets 24 (only one is shown but, as in FIG. 1, there are two sockets 24) to receive legs 25 which are of the same design as shown in FIG. 1. The back 11 and seat portions 12*a* contain a different array slots 19, 20, by which the seat chassis 30 may be anchored to the vehicle's anchor points, using straps (not shown). Additionally, back portion 11 contains a slot 34 to receive the locating tongue 35 of seat 30 and the seat portion 11*a* contains slots 41 to receive feet 38 of stand 36 of seat 30. The seat 30 may thereby be located on and locked to the seat chassis 10 (see FIG. 4).

As an additional locking means, seat portion 11*a* of seat 10 is provided with a clip 42 that locates in slot 37 of stand 36. A baby can therefore be securely carried in seat 30 while facing rearward relative to the vehicle in which the seat is used. The seat 30 is provided with carrying handles 40 so that the seat may be lifted into or out of the car and has straps 39 forming a harness to hold a baby or infant in the seat 30.

It will be seen that the seat 30 when installed faces rearwards with the front edge of seat 30 slightly higher than the rear edge of the seat 30.

Figure 4:
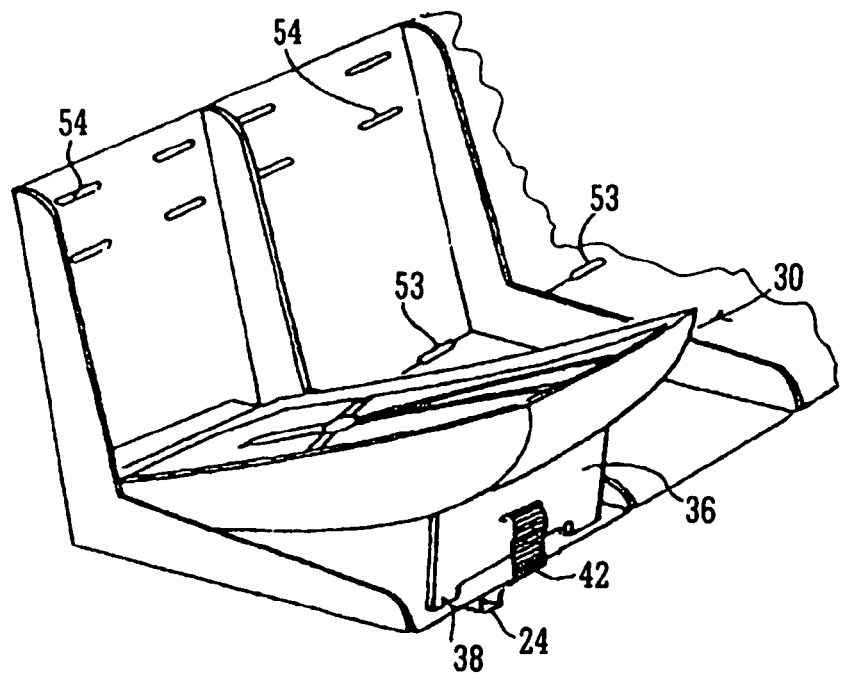
FIG. 4 is a similar view to FIG. 3 showing the seat mounted in the chassis.

Seat 10 has been shown non-upholstered in FIG. 3 or 4 for convenience, but it will be appreciated that all the seat portions on all but the one (or those) that is to receive the seat 30 may be upholstered in a similar way to that shown in FIG. 2.

Figure 5:
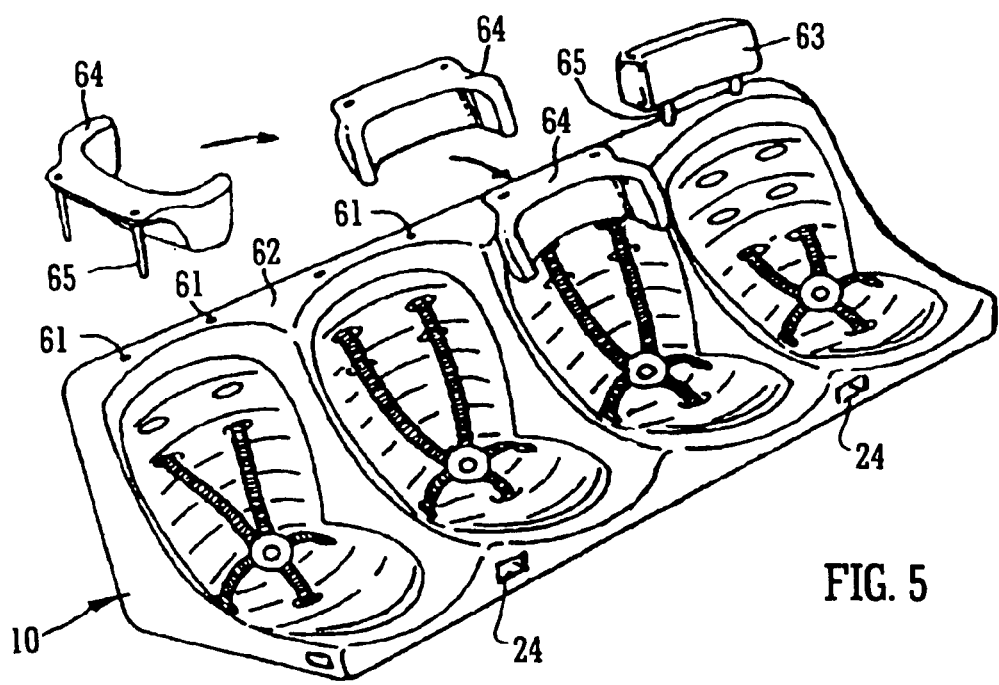
FIGS. 5 and 6 are perspective views of modifications that may be applied to the seat of the invention.
Figure 6:
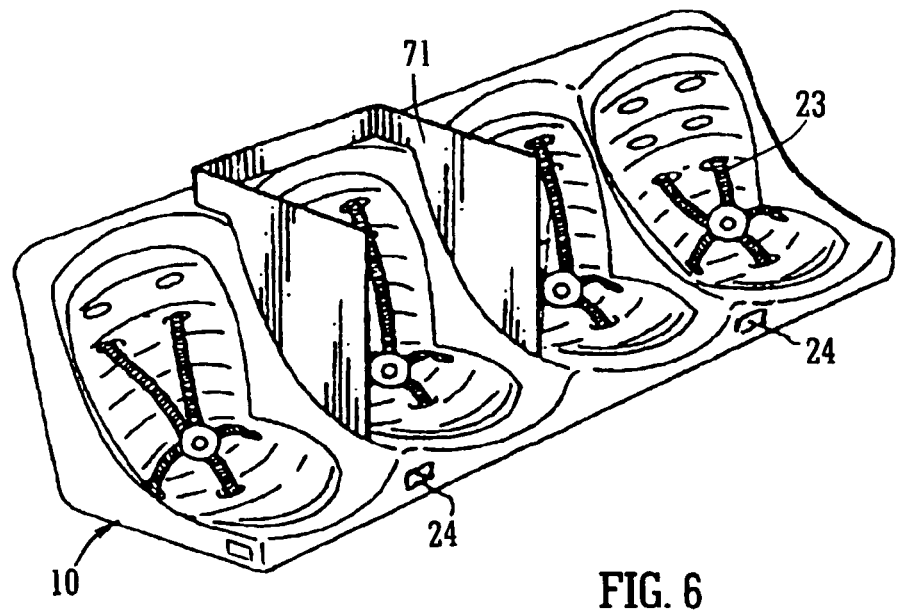

In FIGS. 5 and 6 are shown two modifications to the seat body 10. Here again the chassis 10 is provided with sockets 24 to receive legs 25 that are of the same design as shown in FIG. 1. In FIG. 5, chassis 10 has a series of slots 61 in its upper edge 62 to receive head restraints 63 or 64 which have legs 65 to fit into slots 61. In FIG. 6 the seat 10 is provided with a divider screen 71 which fits into suitable slots 55 (see FIG. 1 or FIG. 3) in the chassis 11 through slots in the upholstery located between individual seats. The screens 71 may be useful in "curtaining off" one seat from another, which may be beneficial when carrying two or more small children.

Figure 7:
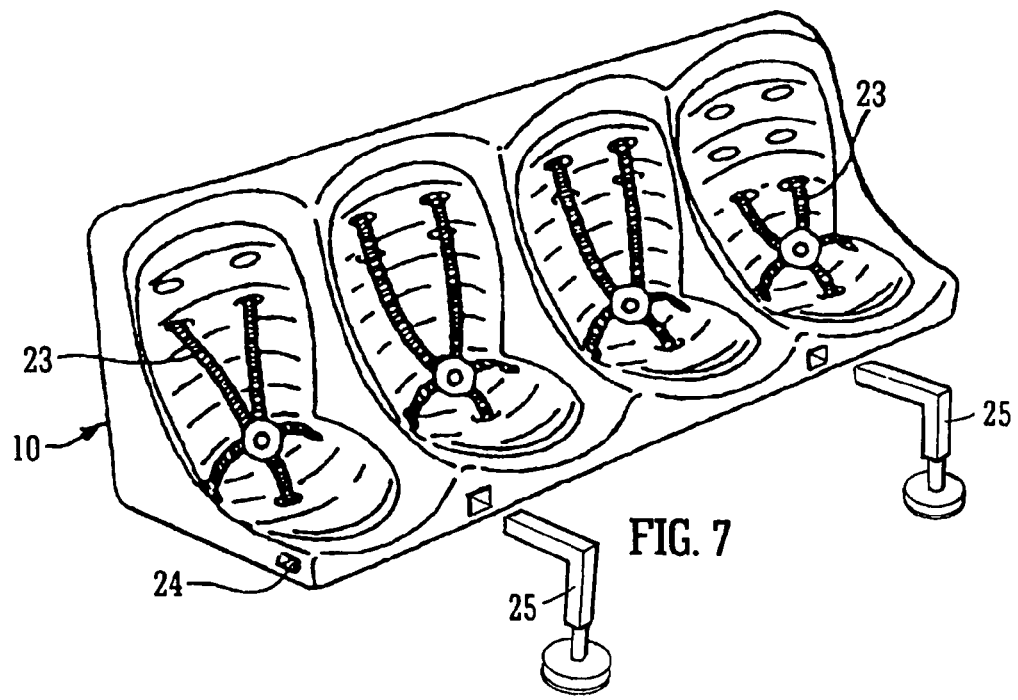
FIGS. 7 and 8 are views of seats similar to that of FIGS. 1 and 2 but having an adjustable leg in accordance with the present invention.
Figure 8:
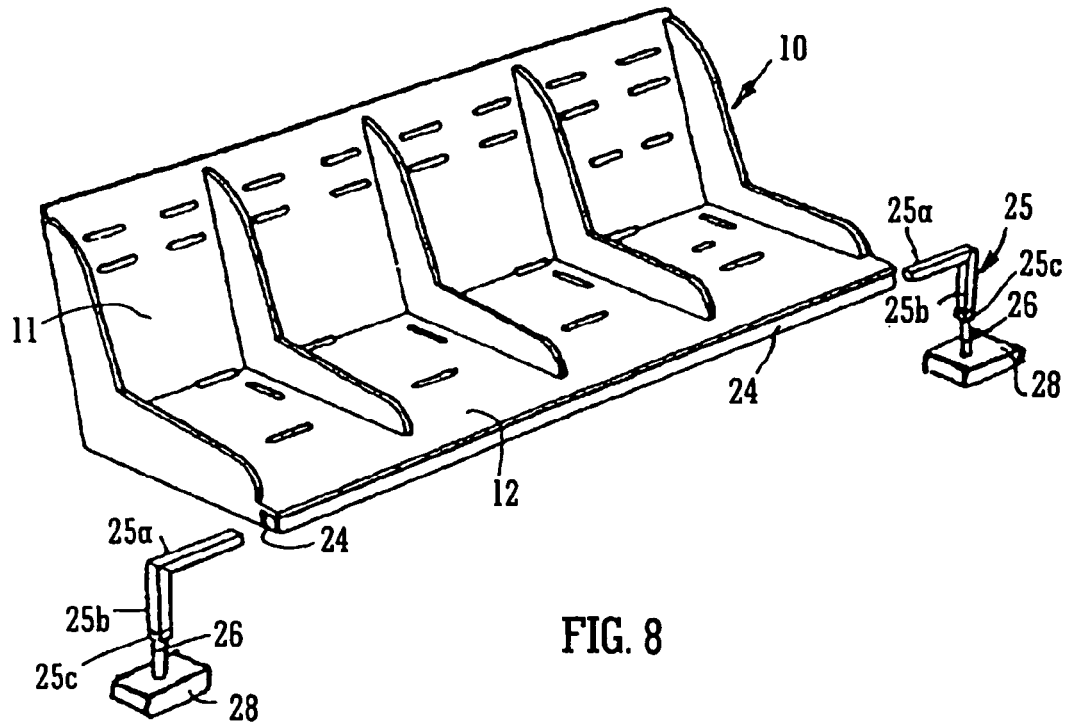

In FIG. 7 a seat 10 of the invention is identical to the seat 10 of FIG. 1 except that it has a hollow socket 24 extending in a direction transverse to the vehicle along its front edge. Here again the chassis 10 is upholstered as shown in FIG. 8.

The socket 24 is open at each end to receive a side extension 25*a* of a leg 25 that is of a similar design to that shown in FIG. 1. The lower end of the vertical portion 25*b* of each leg 25 has a screw-in foot 26 that is screwed into a captive nut 25*a* inside the leg 25. Thus the legs 25 can be adjusted horizontally (sideways when fitted on to a car seat) by virtue of the degree of penetration of extension into hollow socket 24, thereby adjusting the width between the pair of legs 25, and vertically by virtue of the amount foot 26 is screwed into leg portion 25*b*. The legs 25 are provided with an optional energy absorbing pad 28 identical to the pad 28 shown and described in connection with FIG. 1. Similarly, energy absorbing material similar to 28 may be incorporated inside the sockets 24 for the same purpose as described above. If desired, energy absorbing material 28 may be provided inside the downward projecting portion of each leg 25 as described in connection with FIG. 1.

In use, a seat body of FIGS. 2 to 8, comprising an upholstered chassis 10 is located on top of the seat cushions of the existing back seat of a vehicle such as a car. The seat 10 is secured to the vehicle's safety seat anchor points (not shown) by way of safety straps 21 (shown schematically in FIG. 1). The straps 21 will vary in length and direction depending upon the make of vehicle to which the seat 10 is fitted. If seats 30 are to be used, one or more are fitted to the chassis 20 as described above.

A harness comprising straps 39 is fitted into the appropriate slots in the chassis and lengthened or shortened to suit the size of each child. A child is then strapped into each seat using the harnesses 39.

Because the width of a seat 10 of the invention can be tailored to the full width of the rear seat of the car to which it is to be fitted, it can be anchored very securely in position, even if wheel-arches protrude into the car seat edges, so that there is little or no tendency for the safety seat to slide about.

As explained, in the event of a crash, energy is absorbed by the telescoping of one leg tube portion in the other and/or the lower leg deforming and/or crushing the energy absorbing material with the foot.

Figure 9A:
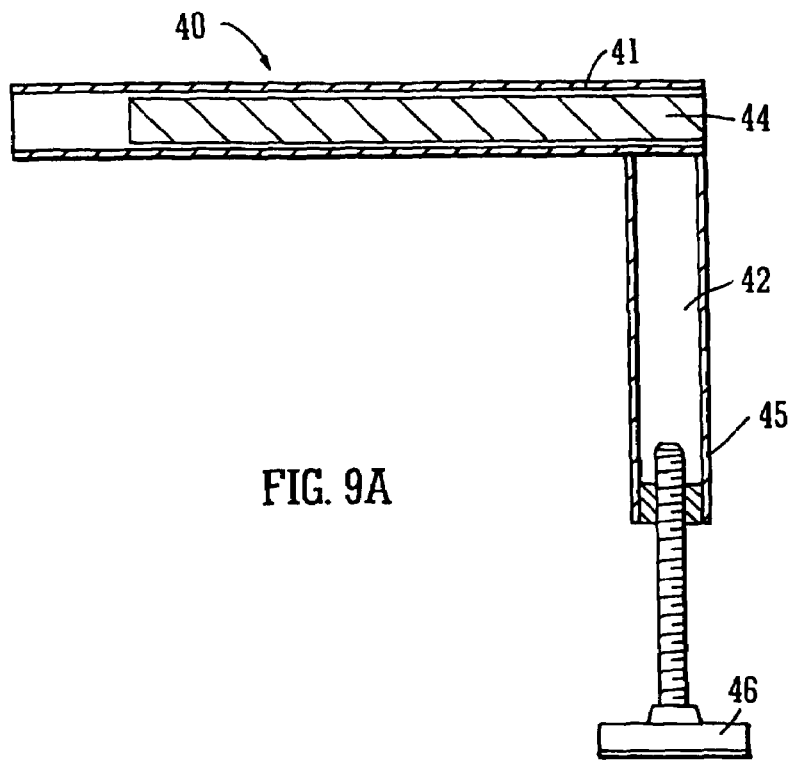
FIGS. 9A and 9B show diagrammatically what happens to another leg assembly of the invention in the event of a crash.
Figure 9B:
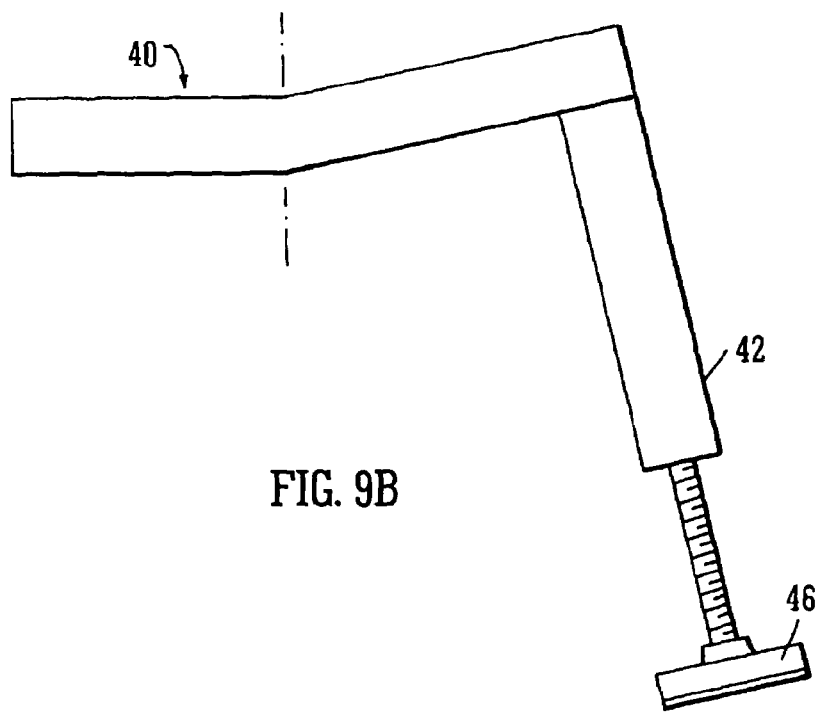

In the embodiment of FIG. 9, the leg 40 consists of an upper horizontal or thigh portion 41 and a lower vertical portion 42 which is at right angles to the upper portion. The upper portion consists of a square section tube 43 having at the end remote from the seat an inner reinforcing bar 44. The horizontal portion extends into the slot 24 adjacent the seat by a distance of about 350 mm, so that the inner end of the bar 44 is adjacent the forward end of the seat. The lower portion consists of a straight portion 45 ending in a small foot 46. As shown in FIG. 9, the leg is free of a shock absorbing pad which enables the foot print to be small and the component cost is reduced. In the event of a crash, the horizontal leg 41 deforms about the forward end of the seat and as shown in FIG. 9B, tends to bend around the point at which the thigh portion extends forward of the slot 24 and the leg 42 may be lifted up off the floor once the shock has been absorbed.

What is claimed is:

1. A safety seat comprising:
    a seat body including a base portion for being positioned on an existing seat of a vehicle and a back portion extending up from the base portion;
    divider means connected to the seat body for subdividing the seat body to provide a plurality of individual seats for accommodating two or more children side-by-side;

releasable anchoring means for connecting the seat body to anchorage points in the vehicle for securing the seat body therein; and support legs extending forwardly of the seat for engaging a body of the vehicle below the base portion and for supporting and providing additional rigidity to the seat body, the support legs being connected to the base portion for vertical and horizontal movement with respect to the base portion, the leg assemblies having a thigh portion to engage the seat body and a lower portion connected to the thigh portion to engage the body of the vehicle and characterized in that the thigh portion has located therein a reinforcing bar to provide energy absorbing means adapted to absorb energy in an accident involving the vehicle.

2. A seat according to claim 1, wherein the thigh portion is adapted to bend upwardly away from the seat.

3. A seat according to claim 1, wherein the forward end of the thigh portion is adapted to bend upwardly in the event of a crash.

4. A seat according to claim 1, wherein the thigh portion extends out from the side of the seat and is adapted to bend upwardly away from the seat.

5. A safety seat comprising:

a seat body including a base portion for being positioned on an existing seat of a vehicle and a back portion extending up from the base portion;

divider means connected to the seat body for sub-dividing the seat body to provide a plurality of individual seats for accommodating two or more children side-by-side;

releasable anchoring means for connecting the seat body to anchorage points in the vehicle for securing the seat body therein;

support legs for engaging a body of the vehicle below the base portion and for supporting and providing additional rigidity to the seat body, the support legs being connected to the base portion for vertical and horizontal movement with respect to the base portion, the support legs comprising an upper generally horizontal portion and a vertical portion, wherein the horizontal portion is adapted to bend upwardly away from the seat and comprises inner reinforcement means adapted to absorb energy in an accident involving the vehicle.

6. A seat according to claim 5, wherein the inner reinforcement means comprises a rod secured in the horizontal portion.

7. A seat according to claim 5, wherein the forward end of the horizontal portion is adapted to bend upwardly in the event of a crash.

8. A safety seat comprising:

a seat body having divider means for sub-dividing the seat body to provide a plurality of individual seats for accommodating two or more children side by side and support legs for engaging a body of the vehicle below the seat and wherein the seat body has elongate sockets extending in a forward direction with respect to said seat when the seat is located in the vehicle;

each of said legs comprising the thigh portion;

said sockets being positioned, dimensioned and arranged to accommodate a thigh portion of the legs; and said legs being arranged for the thigh portion to bend and thereby absorb energy during an accident involving the vehicle whereupon the legs are lifted from the vehicle once the energy has been absorbed.

* * * * *